United States Patent Office 3,407,687
Patented Oct. 29, 1968

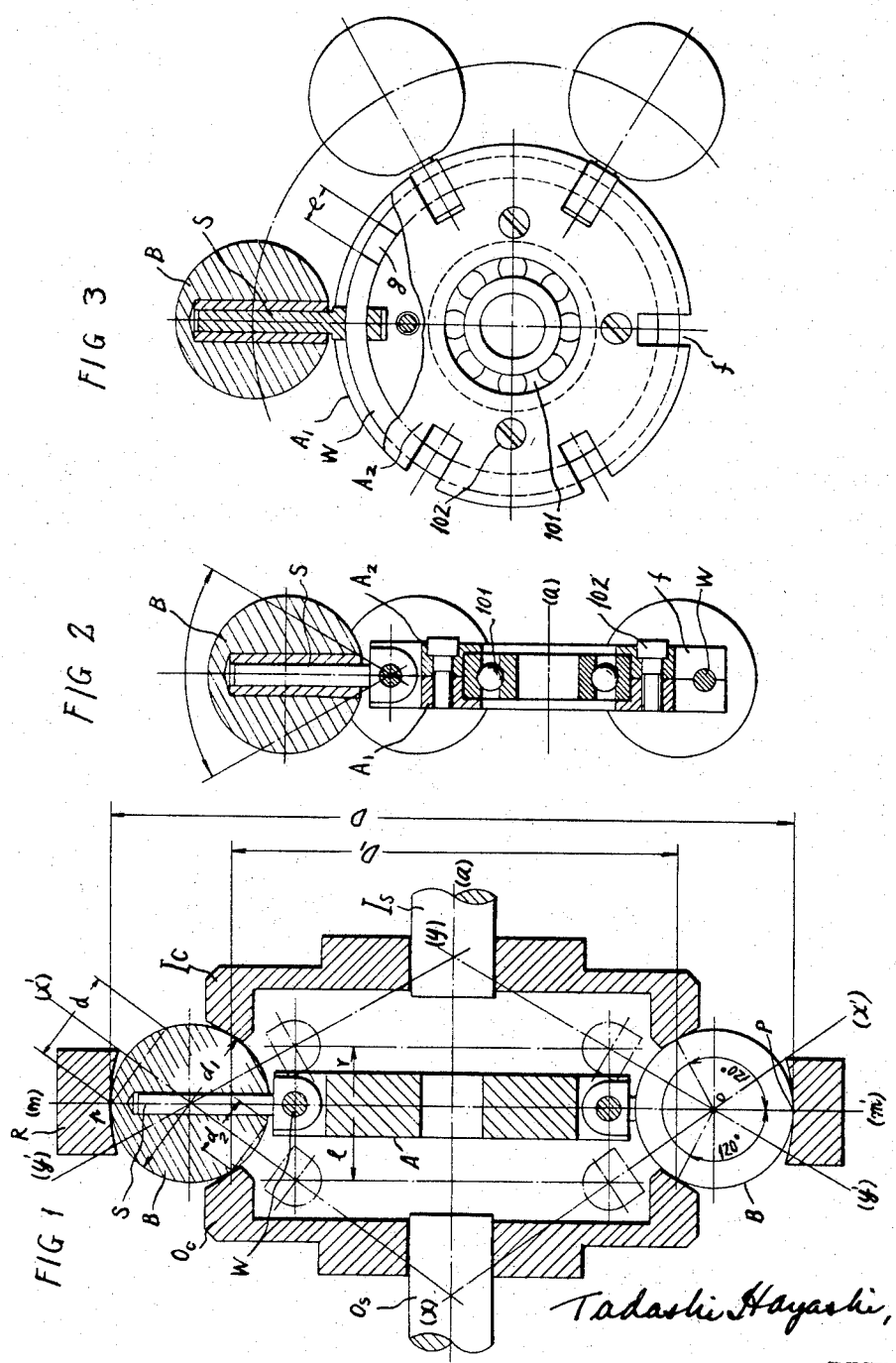

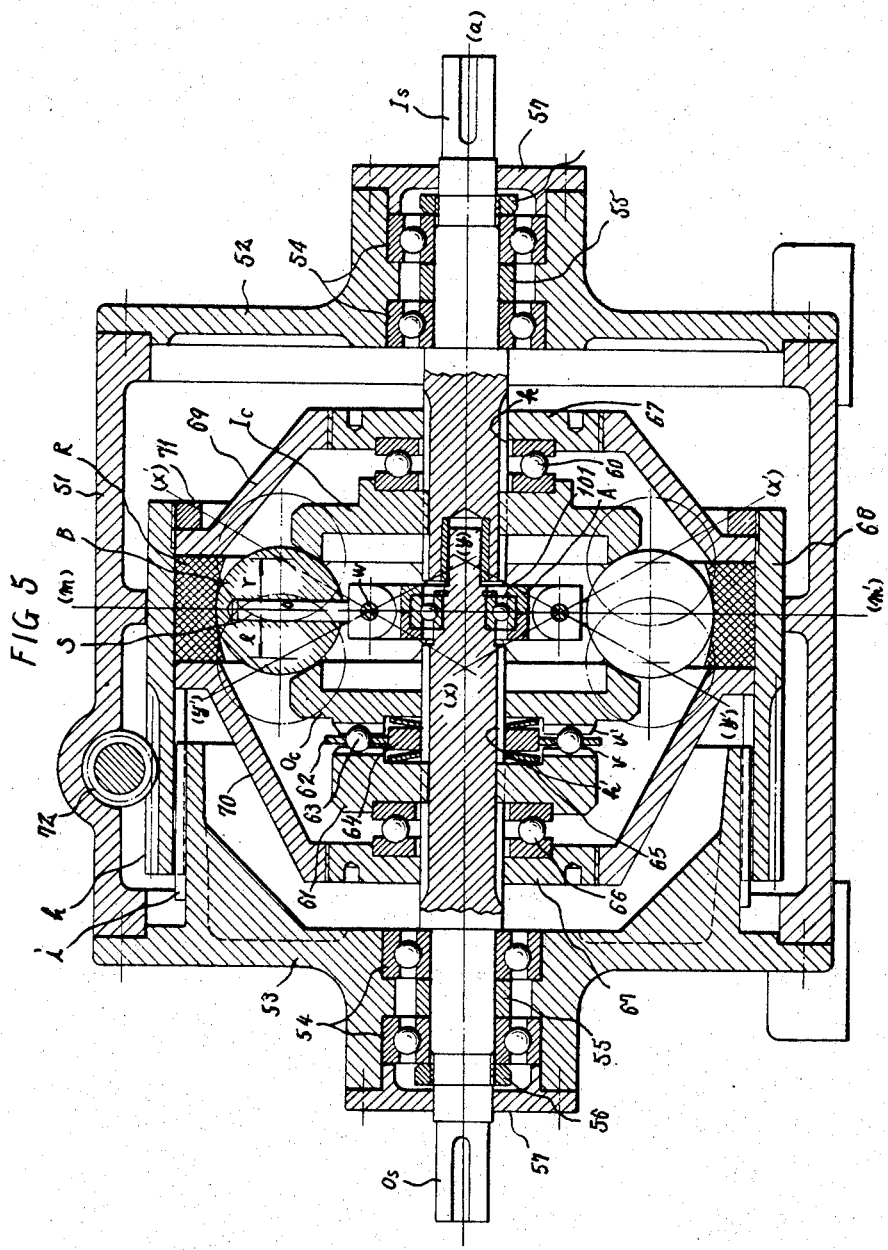

3,407,687
VARIABLE RATIO POWER TRANSMISSION DEVICE
Tadashi Hayashi, 40–1 Hikisonishimachi, Sakai, Osaka-fu, Japan
Filed Mar. 27, 1967, Ser. No. 626,070
6 Claims. (Cl. 74—796)

ABSTRACT OF THE DISCLOSURE

A transmission device comprising, a fixed annular ring, satellite balls in rolling contact with the internal surface of said annular ring, and two friction wheels in contact with said satellite balls, and each wheel being mounted on one of a pair of drive and driven shafts aligned on a main axis. The axis of rotation of the satellite balls is held in a radial direction relative to said main axis and is pivotable about an axis perpendicular to and spaced from said main axis, whereby the speed of rotation of said satellite balls can be changed by changing the inclinations of the axis of rotation of said satellite balls. The driven shaft can thus be driven at various speeds relative to the drive shaft.

The present invention relates to an improvement in a variable power transmission device for transmission of rotary movement, and more practically relates to such a device which includes satellite balls.

The main object of the present invention is to provide a variable ratio power transmission device for transmission of rotary movement which includes a first element comprising drive and driven shafts aligned on a main axis, a second element comprising a rotary carrier having radial axles thereon which are hinged about an axis perpendicular to and spaced from said main axis, which rotary carrier is mounted freely between said drive and driven shafts, a third element comprising satellite balls rotatably mounted on said radial axles on said rotary carrier, a fourth element comprising an annular ring fixed relative to said main axis and with the inner surface of which the satellite balls are in internally rolling contact, a fifth element comprising a drive and driven wheel coupled to said drive and driven shafts and which are in frictional contact with both sides of said satellite balls at portions facing the main axis and pushing said satellite balls toward the internal surface of said annular ring, and a sixth element comprising a control device for changing the variable ratio by changing the inclination of said radial axles. Said sixth element can be either of two means as follows:

(a) Means to shift said rotary carrier by sliding it axially.

(b) Means to shift said frictional contact elements (annular ring, satellite balls, and drive and driven wheels) by sliding them axially while holding the rotary carrier stationary.

Because in the construction of the device of the invention the contacts of the satellite balls, the annular ring and the drive and driven wheels are similar to those of a ball bearing, the device of the invention operates very smoothly and has good durability. Moreover, because the variable ratio can be changed greatly, it is possible to select various speeds easily. It is possible to increase output torque, for instance, by means of a reduction or an increase in the number of satellite balls on the rotary carrier.

The invention will be explained in detail with reference to the accompanying drawings, in which:

FIG. 1 is a sectional diagrammatic view of a variable ratio transmission device according to the invention for explaining the fundamental relation thereof;

FIG. 2 is an axial sectional view of a rotary carrier according to the invention;

FIG. 3 is an elevation view partially in section of the rotary carrier in FIG. 2;

FIG. 5 is an axial sectional view of another embodiment of the device according to the invention.

Figure 4:
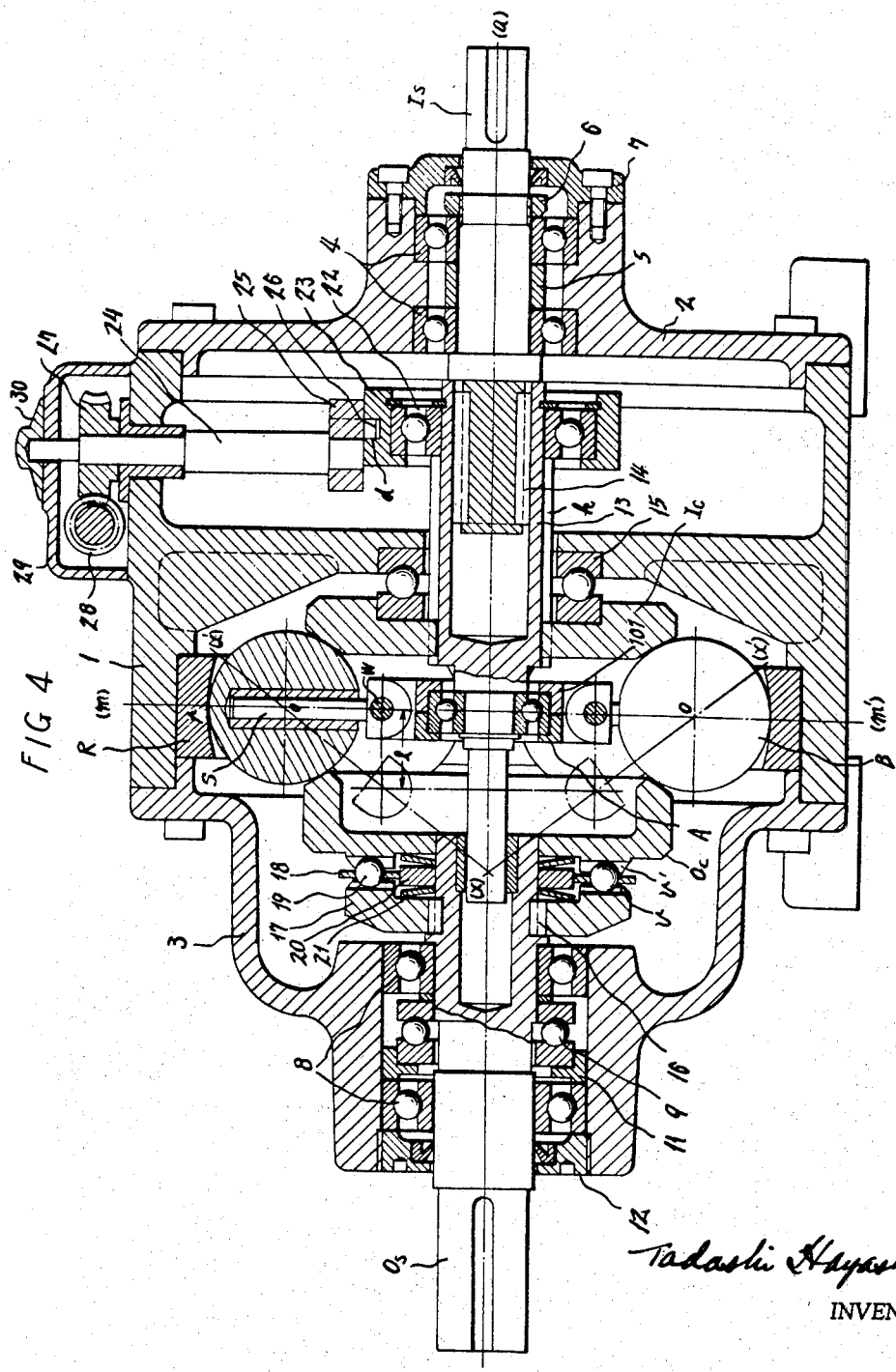
FIG. 4 is an axial sectional view of one embodiment of the device according to the invention.

Referring to FIG. 1, a drive shaft $Is$ and a driven shaft $Os$ are aligned on a main axis $a$ and constitute the first element. A rotary carrier A is freely rotatably mounted between the drive and driven shafts and has radial axles S each of which is hinged on a pivot ring which is a wire ring W, about an axis which is perpendicular to and spaced from main axis $a$, and they constitute the second element. Satellite balls B are rotatably and slidably mounted on said radial axles S on a ball axis through the ball center O, and they constitute the third element. An annular ring R is fixed concentrically around main axis $a$ and the internal surface thereof is in contact with the outer side of the said satellite balls B, and the ring constitutes the fourth element. A drive wheel $Ic$ and a driven wheel $Oc$ are in frictional contact with opposite sides of the satellite balls B at the portions thereof facing the main axis $a$ the wheels constituting the fifth element. These wheels correspond to the inner ring of a ball bearing the satellite balls being pushed out against annular ring R, and being frictionally coupled to said drive and said driven shafts.

It is desirable that the points of contact between the balls B and the wheels $Ic$ and $Oc$ be uniformly spaced about 120° from point of contact P with the annular ring R, which lies on the section $m$–$m'$ transverse to the main axis $a$ through the ball center O.

When the radial axle S is in the plane of section $m$–$m'$ as shown in FIG. 1, the satellite balls S spin at points P due to the frictional drive of the drive wheel $Ic$, and the driven wheel $Oc$ is frictionally driven in the reverse direction but at the same speed as the drive wheel $Ic$.

However, if the rotary carrier A slides and shifts to the left in the direction shown by the arrow 1 along the main axis $a$, the satellite balls begin to roll along the internal surface of annular ring R and the driven wheel $Oc$ is driven by the differential drive to minus, so that the driven axle $Os$ rotates at a decreased speed.

Now, as shown by the dotted line, when the radial axles S incline about the point W as a fulcrum so that they lie along line $x$–$x'$ when the rotary carrier A is shifted to the left in the direction of the arrow 1, the various dimensions of the points are as follows:

$d$—diameter of a perpendicular from the contact point of the satellite balls B with the annular ring R, to the line $x$–$x'$ $d_1$—diameter of a perpendicular from the contact point of the satellite balls with the drive wheel $Ic$ to the line $x$–$x'$ $d_2$—diameter of a perpendicular from the contact point of the satellite balls with the driven wheel $Oc$ to the line $x$–$x'$ $D$—internal diameter of the annular ring R $D_1$—diameter of the contact points of the drive wheel $Ic$ and the driven wheel $Oc$ $N$—r.p.m. of the drive wheel $Ic$ (drive shaft speed)

$n$—r.p.m. of the driven wheel $Oc$ (driven shaft speed)

$N_1$—r.p.m. of the satellite balls B

The formulas governing the speed relationships of the various parts of the device are as follows:

$$N_1 = \frac{N}{1+\frac{D}{d}\cdot\frac{d_1}{D_1}}$$

$$n = \left(1-\frac{d_2}{d}\cdot\frac{D}{D_1}\right)N_1$$

From these formulas it can be seen that the differential in speed between the output and the input shafts will be greater the greater the inclination of the radial axles; a further relation can then be obtained:

$$\frac{d_2}{d}\cdot\frac{D}{D_1} = 1$$

and can be written:

$$d_2.D = d.D_1$$

If this relationship exists, the driven wheel $Oc$ is not driven, and it is not rotated by rotation of the satellite balls B.

When the radial axles S are inclined so as to coincide with line $y-y'$ when the rotary carrier A is shifted to the right in the direction of the arrow $r$ along the main axis $a$, then the satellite balls B roll in the opposite direction from the rotation of the drive wheel $Ic$ and the formula governing the speed relationship can be written as follows:

$$n = \left(1+\frac{d_2}{d}\cdot\frac{D}{D_1}\right)N_1$$

It is understood that in the above relationship, the driven wheel $Oc$ is driven at an increased differential speed up to the rotational speed of drive wheel $Ic$, and then the speed of the driven axle $Os$ is increased.

The said relationships are for the situations in which the rotary carrier A shifts along the main axis $a$, but the relationships are also applicable to the other situations in which the frictional contact members are shifted parallel to the main axis $a$ while the annular ring R, balls B, drive wheel $Ic$ and driven wheel $Oc$ are held fixed relative to one another.

Referring to FIG. 2 and FIG. 3, they show sectional and front views of a rotary carrier according to the invention.

The radial axles S of rotary carrier A have hinge-shaped ends having a hinge pinhole therein, and these ends are passed through an opening $e$ in the pivot ring W and pivoted on the ring W.

A pair of matching carrier halves $A_1$ and $A_2$ are each provided with openings for the hinge-shaped ends uniformly distributed around the circumference of the halves, and each has formed therein a circular groove $g$ having a half round cross-section.

The outer ring of a ball bearing 101 and the said pivot ring W having radial axles S thereon are mounted in one of said halves, and the other half is secured thereto by bolts 102.

Thus, the construction of the rotary carrier is very convenient, and it is easy to mount the hinged radial axles, which are distributed uniformly around main axis $a$ for balancing the mechanism.

Referring to FIG. 4, there is shown an axial sectional view of a first embodiment of the invention.

A drive side casing 2 and a driven side casing 3 are joined to the ends of a cylindrical casing 1, the drive shaft $Is$ is mounted in the housing of casing 2 in ball bearing 4 spaced by spacing collar 5 and held in place by nut 6 and housing cover 7. The driven shaft $Os$ is mounted in the housing of the casing 3 in ball bearings 8, separated by thrust bearing 9 and spacing collars 10 and 11 and held in place by threaded cover 12. Shafts $Is$ and $Os$ are thus aligned on a main axis $a$.

A sleeve 13 is slidably fitted on the drive shaft $Is$ and is slidable in the axial direction thereof and rotates together with the drive shaft $Ic$, being keyed thereto by 14 on the said drive shaft. An elongated end of the said sleeve is fitted in an axial bore in the driven shaft $Os$, so that it can both rotate and slide along said main axis $a$.

The inner race ring of ball bearing 101 of the rotary carrier A is fixed to a portion of the elongated end of the said sleeve 13 between the drive wheel $Ic$ and the driven wheel $Oc$, and the satellite balls B are fitted on the hinged radial axles S of the rotary carrier A, so that the carrier A can rotate and slide.

The satellite balls B are in rolling contact with the internal surface of annular ring R, fixed in the cylindrical casing 1 concentric with the main axis $a$, and the opposite sides of the satellite balls at portions facing the main axis $a$ are in frictional contact with the drive wheel $Ic$ and the driven wheel $Oc$ respectively.

The drive wheel $Ic$ is engaged with the spline $k$ on said sleeve 13 and is supported by the thrust ball bearing 15 against the wall of casing 1, and it is always driven in this position despite any sliding of the said sleeve 13 by which the displacement of the said rotary carrier A is carried out.

The driven wheel $Oc$ is freely rotatably mounted on the end of output shaft $Oc$ and the driven member 17 is fixed to the shaft $Oc$ by the key 16 on the driven shaft $Os$, and each of the opposed faces has formed therein radial V-shaped grooves $v$ and $v'$ and steel balls 19 supported by a retainer 18 are engaged in the said V-shaped grooves $v$ and $v'$. Therefore, the pressure at contact points of the satellite balls B with the wheels $Ic$ and $Oc$ should be proportional to the load on the driven shaft.

In addition, a pair of dish springs 21 and a spacing collar 20 are mounted between the said opposed faces on the driven axles $Os$, for pre-loading the contact points of the satellite balls B and wheels $Ic$ and $Oc$.

Means are also provided for displacement of the rotary carrier A, a ball bearing 22 is mounted on the hollow end of said sleeve 13, and the outer ring thereof is supported in a housing 23 which has a recess $d$ therein, and an eccentric crank pin 26 on a shift arm 25 is engaged in said recess $d$.

The shift arm 25 is fixed to a shifting axle 24 which is perpendicular to the main axis $a$, and a worm wheel 27 is fixed on an elongated end portion outside of the casing 1. The worm wheel 27 is engaged with a worm 28 which can be operated from outside of the casing 1. A speed meter disk 30 is fixed on the end of said shifting axle 24 on the upper face of the cover 29.

When the radial axles S on the rotary carrier A are each in a position corresponding to the transverse section $m-m'$ as shown, the satellite balls B spin at point $p$ due to the frictional drive of the drive wheel $Ic$, and then the driven wheel $Oc$ is frictionally driven in the opposite direction and at the same speed as that of the drive wheel $Ic$.

Now if the worm 28 is operated in a direction to slide the sleeve 13 on the drive axle $Is$ so that the rotary carrier A is displaced in the direction of arrow 1, the radial axles S of rotary carrier A are inclined by pivoting around the said pivot ring. Balls S revolve in the same direction as the drive wheel $Ic$ and the driven wheel $Oc$ is driven in the opposite direction at a differential speed lower than that of drive wheel $Ic$.

In order for the construction shown in FIG. 4 to drive the output shaft at a speed higher than the driving speed, it is necessary to operate worm 28 to shift rotary carrier A in the direction of the drive axle $Is$.

FIG. 5 shows an axial sectional view of another embodiment according to the invention.

A drive side end cover 52 and a driven side end cover 53 are joined to a cylindrical casing 53, and the drive shaft $Is$ and the driven shaft $Os$ are mounted in each cover in ball bearings 54, spaced by distance collars 55, and held in place by nuts 56 and cover 57, so that the shafts are aligned on the main axis $a$. An elongated end of driven shaft $Os$ is fitted in a bore in driving shaft $Is$ and is rotatable therein.

The inner ring of ball bearing 101 of rotary carrier A is fixed to the elongated portion of driven shaft Os between the said low shafts, and the satellite balls B are mounted on the hinging radial axles S on rotary carrier A so as to both rotate and slide.

The elongated end of the shaft can also be on the drive shaft Is and the bore for receiving it in the driven shaft Os.

The outside of each of the satellite balls B is in rolling contact with the internal surface of annular ring B which is fixed in a slidable cylinder 68 which can be shifted along the main axis a.

The opposite sides of satellite balls B facing the main axis a are in frictional contact with the drive wheel Ic and the driven wheel Oc respectively, which in turn push the balls B toward the annular ring R.

The drive wheel Ic is engaged with the spline K on the drive shaft Is, and is movable therealong in the axial direction and is driven directly therefrom.

The driven wheel Oc is mounted loosely on the spline k on the driven shaft Os, and is coupled to a driven member 61 which engages the spline k and has a face opposed to the face on the output shaft side of driven wheel Oc. Each of the opposed faces has formed therein radial V-shaped grooves v and v' and steel balls 63 are supported in a retainer 62 and are engaged in said grooves. A pair of the dish springs 65 and spacing collar 64 are mounted between the said opposed faces near the driven shaft Os. This arrangement produces frictional driving pressure on the satellite balls for the transmission of movement in the same manner as described in connection with FIG. 4.

The slidable cylinder 68 has attached to the end coverings 69 and 70 and these are held in place by a threaded retaining ring 71. Threaded end members 67 are provided at each end to close the ends of end coverings 69 and 70. A thrust bearing 60 is positioned between end member 67 and drive wheel Ic and a thrust bearing 66 is provided between end member 67 and driven member 61. The slidable cylinder 68, and coverings 69 and 70 and end members 67 together form a cylindrical cage.

The slidable cylinder 68 has a screw thread i on the inner face of one end thereof and a helical gear h on the outer face of the same end. The inner screw thread i is engaged with a corresponding thread on the outside of a projection on the end cover 53. A helical gear h on the outside of cylinder 68 is engaged with a worm 72 which it is possible to operate from outside of the casing 51.

The cylindrical cage can be rotated and shifted in the direction along the main axis a by operation of the worm axle.

When the radial axles S are in a plane coinciding with the transverse section m-m' as shown, the satellite balls B spin at points p due to the frictional drive of the drive wheel Ic, and the driven wheel Oc is driven in the opposite direction and at the same speed as that of the drive wheel Ic.

When the cylindrical cage is displaced to the right as shown by arrow r by the operation of the worm 72 and the radial axles S of rotary carrier A pivot around the pivot ring W as a fulcrum to the position shown by dotted line x–x', the relative positions of each of the elements in the cylindrical cage remain the same.

Accordingly, the satellite balls B revolve in the same direction as the drive wheel Ic, and the driven wheel Oc is driven in the opposite direction at a reduced speed.

When the cylindrical cage rotates and is displaced to the left in the direction of arrow 1, the radial axles S swing around the pivot ring W as a fulcrum to the position shown by the dotted line y–y'.

Then the satellite balls revolve in the opposite direction from the drive wheel Ic and the driven wheel Oc is driven in the opposite direction at a higher speed than that of drive wheel Ic.

From the description of the invention as shown in FIGS. 1 to 5, it can be seen that the general advantages of the invention are as follows:

It is very smooth in its operation and has good durability, because it is similar in construction to a ball bearing.

Because the variable driving ratio can vary widely, it is possible to select various speeds easily.

Moreover, it is easy to increase output torque, for instance by increasing the number of satellite balls, which can easily be added to the rotary carrier.

What is claimed is:

1. A variable ratio power transmission device comprising a drive shaft and a driven shaft aligned on a main axis, a rotary carrier freely rotatably mounted for rotation around said main axis and positioned between said shafts, said rotary carrier having a plurality of radially extending axles pivotally mounted thereon for pivotal movement around axes which are perpendicular to and spaced from said main axis, a plurality of satellite balls, one rotatably and slidably mounted on each of said axles, an annular ring concentric with said main axis and fixed against rotation relative to said main axis, said satellite balls running against the inner surface of said ring, a drive wheel on said drive shaft and having a peripheral portion frictionally engaged with said satellite balls for driving said satellite balls in rotation around said axles and along said annular ring, a driven wheel coupled to said driven shaft and having a peripheral portion frictionally engaged with said satellite balls and rotatably driven by said satellite balls, said drive and driven whees bearing on said satellite balls and urging them outwardly against said annular ring, said annular ring and drive and driven wheels constituting an assembly, and at least one of said assembly and said rotary carrier being movable along said main axis relative to the other, and means coupled to the movable one of said assembly and said rotary carrier for moving it along said main axis for tilting said axles about said tilting axles to inclined positions for changing the speed of said driven wheel and driven shaft relative to the speed of said drive wheel and said drive shaft.

2. A power transmission device as claimed in claim 1 in which said assembly is fixed and said rotary carrier is movable along said main axis.

3. A power transmission device as claimed in claim 2 in which said drive shaft has a sleeve thereon on which is keyed to said drive shaft so as to be rotatable therewith and which is slidable along said drive shaft, said sleeve having the free end thereof rotatably journaled within the end of said driven shaft, said rotary carrier being rotatably mounted on said sleeve and fixed against movement relative to said sleeve along said main axis, and said driving wheel is keyed to said sleeve for rotation with said sleeve, and a thrust bearing against said driving wheel holding said driving wheel against movement along said main axis, and said means for moving said one of said assembly and said rotary carrier comprises means coupled to said sleeve for moving said sleeve along said main axis.

4. A power transmission device as claimed in claim 1 in which said rotary carrier is fixed and said assembly is movable along said main axis.

5. A power transmission device as claimed in claim 4 in which said assembly includes a cylindrical casing on the inside of which said annular ring is fixedly mounted, said cylindrical casing being mounted on said shafts for rotation relative to said shafts, said drive and driven wheels being slidably mounted on said shafts and rotatable therewith, and thrust bearings between said cylindrical casing and said drive and driven wheels, whereby when said cylindrical casing is moved said annular ring and said drive and driven wheels are moved along said main axis, and said means for moving said one of said assembly and said rotary carrier comprises means coupled to said cylindrical casing for moving said cylindrical casing along said main axis.

6. A power transmission device as claimed in claim 1 in which said rotary carrier comprises two mating halves each of which have openings around the periphery thereof for receiving the ends of said axles, and the opposed faces of which each have a circular groove having a half round cross section, a ring having a break therein in said circular groove and held in place between the two halves of said carrier, and said axles being positioned in said openings and having apertures in the ends thereof through which said ring extends to provide the pivotal mounting of said axles, said openings extending into the periphery of said rotary carrier beyond the said ring to permit hinging of the axles on said ring.

References Cited
UNITED STATES PATENTS

| | | | |
|---|---|---|---|
| 2,660,073 | 11/1953 | Patin | 74—796 |
| 3,246,531 | 4/1966 | Kashihara | 74—796 |
| 3,287,994 | 11/1966 | Kotik | 74—796 |

FREDERICK L. MATTESON, JR., *Primary Examiner.*

ALLAN D. HERRMANN, *Assistant Examiner.*